United States Patent [19]

Rutty

[11] 3,942,738

[45] Mar. 9, 1976

[54] COILABLE RULE

[75] Inventor: Edward Charles Rutty, Portland, Conn.

[73] Assignee: The Stanley Works, New Britain, Conn.

[22] Filed: Sept. 16, 1974

[21] Appl. No.: 506,460

[52] U.S. Cl. .............. 242/107.2; 33/138; 242/107.3
[51] Int. Cl.² ...................... B65H 75/48; G01B 3/10
[58] Field of Search .......... 33/138; 242/84.8, 107.2, 242/107.6, 107.3

[56] References Cited
UNITED STATES PATENTS 3,214,836  11/1965  West ..................................... 33/138
3,816,925   6/1974  Hogan et al. ......................... 33/138

Primary Examiner—Richard E. Aegerter
Assistant Examiner—Steven L. Stephan
Attorney, Agent, or Firm—Prutzman, Hayes, Kalb & Chilton

[57] ABSTRACT

This disclosure relates to a brake member for a tape measure in which the brake member is symmetrical so that in assembly either end can be placed in contact with the tape measure. There is also provided two detents for the brake member to hold it in either its braking or non-braking position.

4 Claims, 4 Drawing Figures

COILABLE RULE

This invention relates to coilable rules and is an improvement upon the invention disclosed and claimed in U.S. letters Pat. No. 3,214,836 issued Nov. 2, 1962 upon an application of Robert F. West and assigned to the assignee of the present invention.

The principal object of this invention is to provide an improved coilable rule incorporating a novel lock mechanism for releasably holding the measuring tape blade against movement in its various extended positions.

Another object of the present invention is to provide such a coilable rule which will permit adjustment of the measuring tape to different extended positions while retaining the lock mechanism in locking position wherein the measuring tape is frictionally held in its extended position. Included in this object is the provision of an improved detented lock mechanism for holding the tape blade in its locking and non-locking positions.

A still further object of the present invention is to provide in such a coilable rule a novel lock mechanism which is symmetrical in design to provide for fool-proof assembly and lower cost of production.

Other objects will be in part obvious and in part pointed out more in detail hereinafter.

A better understanding of the invention will be obtained from the following detailed description and the accompanying drawings of an illustrative application of the invention.

Figure 1:
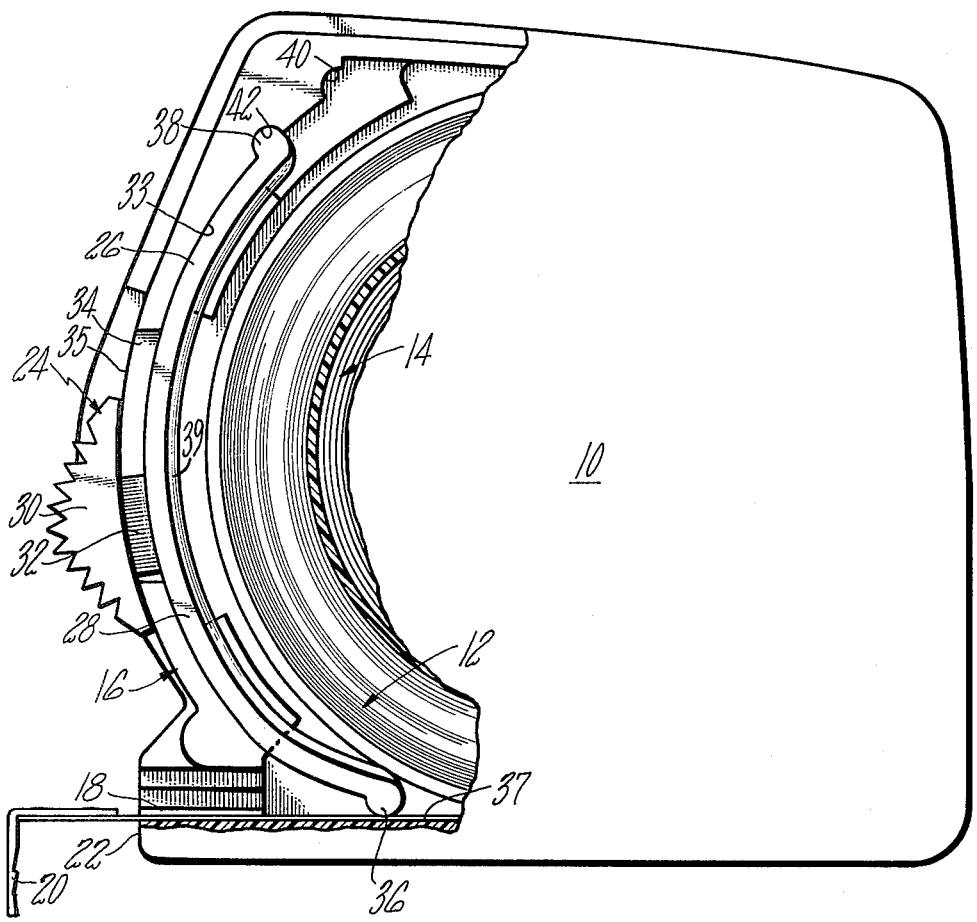
FIG. 1 is a side elevational view of an illustrative coilable rule embodying the invention with portions broken away to show the improved lock mechanism in its locking position.
Figure 4:
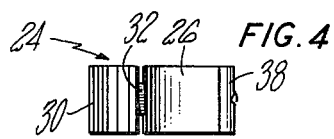
FIG. 4 is a top elevational view thereof.
Figures 2, 3:
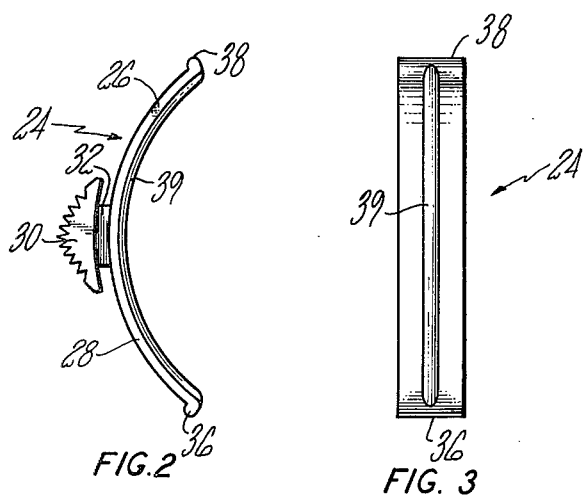
FIG. 2 is a side elevational view, on a reduced scale, of the lock mechanism of the invention.
FIG. 3 is a rear elevational view thereof.

Referring now to the drawings in detail, FIG. 1 is an illustrative embodiment of the present invention wherein a coilable rule is shown as having a hollow casing 10 defining a chamber to receive the coiled measuring tape blade 12, preferably formed of spring steel, and the recoil spring 14 which serves as a spring motor connected to the inner end of the coiled tape blade 12 to recoil the same into the casing 10.

As shown, the front wall 16 is provided, at the lower edge thereof, with an opening 18 through which the tape blade 12 passes. The outer end of the tape blade 12 is provided with a hook 20 for facilitating the manipulation of the measuring tape and for limiting the movement of the tape into the casing 10 by its engagement with the lip 22 of the housing as the tape reaches the termination of recoil into the casing.

In accordance with the present invention, there is provided an improved lock mechanism for releasably wedging the measuring tape blade 12 against the bottom wall 37 of the casing thereby to secure the measuring tape blade against movement in any of its extended positions. In the illustrated embodiment, the lock mechanism comprises an arcuate brake member 24 preferably molded from a suitable flexible resilient hard-wearing and self-lubricating material such as nylon. The arcuate brake member 24 includes thin tongue-like symmetrical upper and lower portions 26, 28 which are mirror images of each other and have the same radius of curvature and an intermediate portion 30 positioned at the midpoint between the upper and lower portions and offset therefrom by a necked down web 32 which extends through a slot 34 in the front wall of the casing 10 so that the intermediate portion 30 is exposed to serve as a finger piece or button for the manipulation of the locking mechanism.

The brake member 24 is mounted for sliding movement against the concave inner surface 33 of the front wall of the casing with the button 30 bearing against the arcuate outer surfaces 35 of the front wall 16 adjacent the slot 34 to mount the brake member 24 on the casing 10.

The lower portion 28 of the brake member 24 is provided with a tab or shoe 36 at the end thereof which, in the illustrative embodiment, is integrally formed on the extremity of the lower portion 28 of the brake member 24 and projects generally perpendicular therefrom. When the brake member 24 is rotated counter-clockwise, as viewed in the drawings, by means of the finger piece 30 until it reaches its lower-most position (as shown in FIG. 1), the shoe 36 engages the top surface of the measuring tape blade 12 so as to force it against the bottom wall 37 of the casing to frictionally hold the blade against movement.

It will be apparent that the cooperation between the button and the front wall of the casing provides a cantilever mounting for the upper and lower portions 26, 28 of the brake member 24.

Due to such cantilever mounting and the concave inner surface 33 of the front wall 16 of the casing 10, the lower portion of the brake member 24 engages the tape blade 12 at an acute angle pointed in the coiling direction of the tape blade and provides a uniform level of frictional force without requiring close dimensional tolerances in the manufacture of the brake member or the tape casing. Additionally, the maintenance of the wedging engagement between the shoe 36 and the tape blade 12 is aided by the biasing force imparted by the spring motor 14 tending to move the tape blade 12 to its coiled position. A reinforcement rib 39 is provided to augment the biasing force of the thin tongue-like cantilever mounted lower portion 28 of the brake member 24. The free edge of the brake shoe 36 is preferably formed so to conform with the contour of the top side of the measuring tape blade 12 so as to provide broad surface contact therebetween.

As shown in FIG. 1, the arcuate inner surface 33 of front wall 16 is provided with a pair of spaced recesses 40, 42. The upper portion 26 of the brake member 24, being symmetrical with the lower portion 28 thereof, is provided with a tab or shoe 38 which is identical to the shoe 36. Shoe 38 serves as a detent biased into the recess 40 due to the cantilever mounting of upper portion 26 of brake member 24 to latch the brake member 24 in its unlocked position.

Similarly, tab 38 serves as a detent engageable with recess 42 to latch the brake member in its locking position. By providing for the detenting of the brake member in its locking position, the possibility of releasing the brake member 24 during the adjustment of the tape when the brake member is in a locking position is obviated.

In operation, when the tape blade 12 is extended to its desired position, the operator is merely required to push the button 30 downwardly into the locking position where the detent 38 is engaged in the recess 40. As described above, the brake shoe 36 then resiliently and frictionally engages the tape blade 12 to wedge the same against the bottom wall 24 of the casing with sufficient force to hold the tape against undesired movement.

Since the holding power of the brake member 24 is determined by the inherent resiliency of the cantilevered lower portion 28 of the brake member 24, it will be appreciated that, should it be desired to extend the tape a greater amount, the braking force applied to the tape by the lock mechanism may be overcome without damage to the tape blade 12 or the brake member 24.

When it is desired to recoil the tape, the operator merely has to push the button 30 upwardly to its release position wherein the tab 38 engages the recess 40 to release the braking force applied to the tape blade 12 so that the tape may, under the influence of the spring motor 14, automatically recoil into the casing.

As indicated above, the coilable rule of this invention provides a lock mechanism wherein the brake member 24 is symmetrical to eliminate the possibility of misassembly in the casing, provides a construction in which the lock is detented into its braking position to prevent inadvertent release thereof during manual adjustment of the tape blade while the brake member is in its operative position, and provides a design adapted for lower manufacturing costs.

As will be apparent to persons skilled in the art, various modifications, adaptations and variations of the foregoing specific disclosure can be made without departing from the teachings of the present invention.

I claim:

1. In a coilable rule including a casing having a slotted arcuate front wall provided with an opening forming a mouth adjacent the lower edge thereof and a flat bottom wall, a measuring tape blade coilable in the casing, a brake member for releasably holding the tape blade against unintended movement from a desired extended position, said brake member comprising upper and lower arcuate portions with shoes at the ends thereof and an intermediate offset finger piece connected thereto by a necked down web received in the slot of said front wall of the casing to cantilever mount said upper and lower portions on said casing for slideable movement toward and away from the tape blade between locking and unlocking positions and to bias said lower arcuate portion of the brake member into engagement with said tape blade at an acute angle to the coiling direction of the tape to clamp the blade against the flat bottom wall when said brake member is in its locking position, the improvement wherein said upper and lower arcuate portions are mirror images of each other and the shoes thereof project radially outwardly from the ends thereof, respectively, and said front wall further provides a pair of spaced recesses which cooperate with the shoe of the upper arcuate portion to detent the brake in both the locking and unlocking positions thereof.

2. The coilable rule of claim 1 wherein said upper and lower arcuate portions of said brake member are provided with a reinforcing rib to fix the biasing force thereof.

3. The coilable rule of claim 1 wherein said finger piece and said upper and lower arcuate portions of said brake member straddle said slot.

4. The coilable rule of claim 1 wherein a spring motor biases said tape blade into its coiled position within the casing.

* * * * *